May 12, 1970  C. P. MANTOOTH  3,512,165

PNEUMATIC VEHICLE RECORDER

Filed Aug. 23, 1968  2 Sheets-Sheet 1

INVENTOR.
CHARLES P. MANTOOTH,
BY
Berman, Davidson & Berman
ATTORNEYS.

May 12, 1970     C. P. MANTOOTH     3,512,165
PNEUMATIC VEHICLE RECORDER
Filed Aug. 23, 1968     2 Sheets-Sheet 2
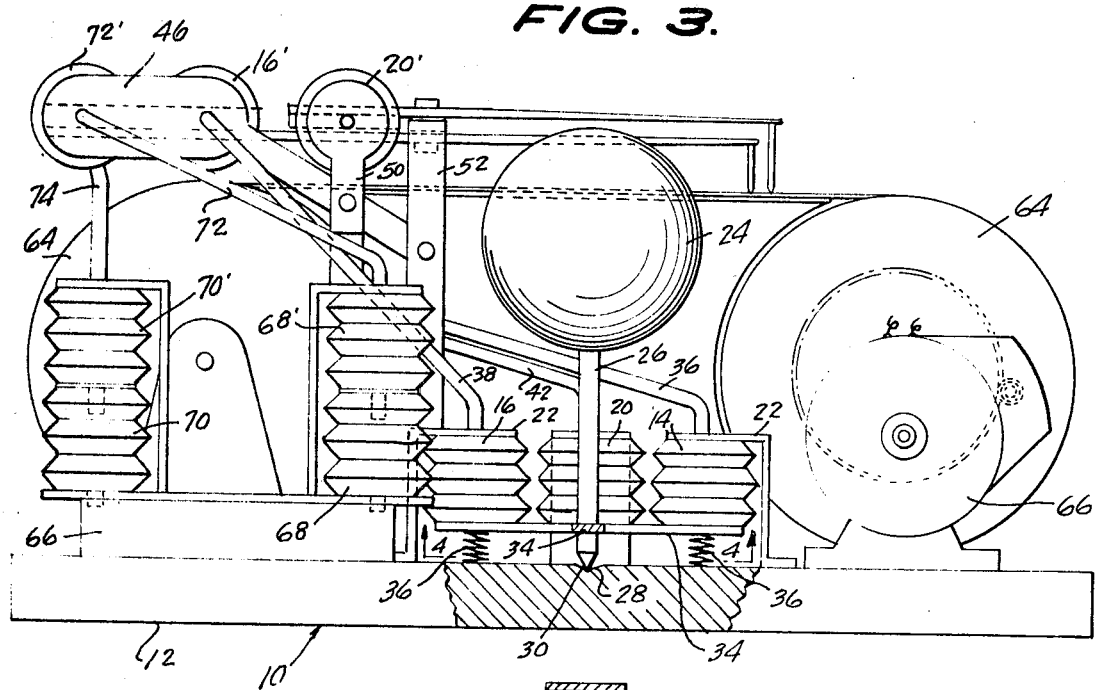
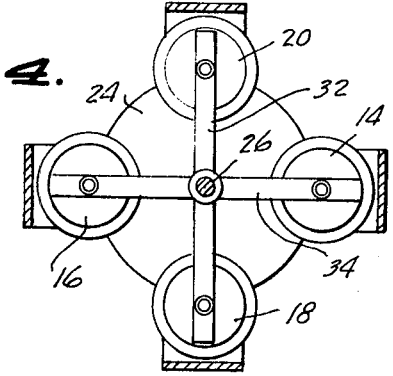
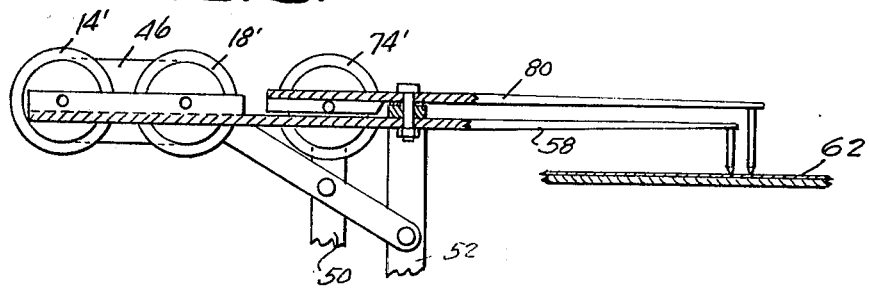
INVENTOR.
CHARLES P. MANTOOTH,
BY
Berman, Davidson & Berman
ATTORNEYS.

United States Patent Office 3,512,165
Patented May 12, 1970

3,512,165
PNEUMATIC VEHICLE RECORDER
Charles P. Mantooth, 2633 Magnolia Ave.,
Knoxville, Tenn. 37914
Filed Aug. 23, 1968, Ser. No. 754,764
Int. Cl. G01d 9/00
U.S. Cl. 346—7                                9 Claims

ABSTRACT OF THE DISCLOSURE

A device for indicating the driver attitude of an operator comprising bellows means disposed on opposite sides of a centrally located actuating means with the centrally located actuating means having lever means and stem means for compressing the bellows means to force fluid from the bellows means through a line to a corresponding bellows means to actuate recording means which transcribe said action on a permanent record.

---

The present invention relates to an indicator device and more particularly to an indicator device including pneumatic means which are actuated by inertia and which, in turn, cause fluid to operate stylus means so as to record the result of inertia.

It is an object of the present invention to provide an indicator device so that all of the stops, starts, and corners turned in a vehicle will reflect the driver's attitude, as well as his unconscious habits while operating a vehicle.

It is another object of the present invention to provide an indicator device which can record or indicate the inertia involved in coming to a quick stop or the inertia involved in abruptly starting and recording the driving attitude of an operator of a vehicle so that he can improve his driving habits.

It is yet another object of the present invention to provide an indicator device for utilization with a moving vehicle and the like which is provided with a plurality of pressurized bellows members and actuating means for causing the bellows members to be compressed in response to an inertia mechanism so that the resulting force is transmitted from the bellows member to a corresponding bellows member in order to actuate a stylus which is in contact with a recording member so that the results of the inertia force can be recorded.

It is yet another object of the present invention to provide an indicator device which can record the sway of a vehicle in accordance with the attitude of the driver of the vehicle, and which can further record the attitude in starting and stopping a vehicle by the operator, and which can further record the contour the land or terrain over which the vehicle passes.

Various other objects and advantages of the present invention will be readily apparent from the following detailed description, when considered in connection with the attached drawings forming a part thereof, and in which:

FIG. 3 is a side view of the indicator device embodied in the present invention, with portions broken away and shown in section, particularly illustrating the inertia mechanism embodied in the invention;

FIG. 4 is a section taken along the lines 4—4 of FIG. 3; and

FIG. 5 is a view taken along the lines 5—5 of FIG. 1.

Figure 1:
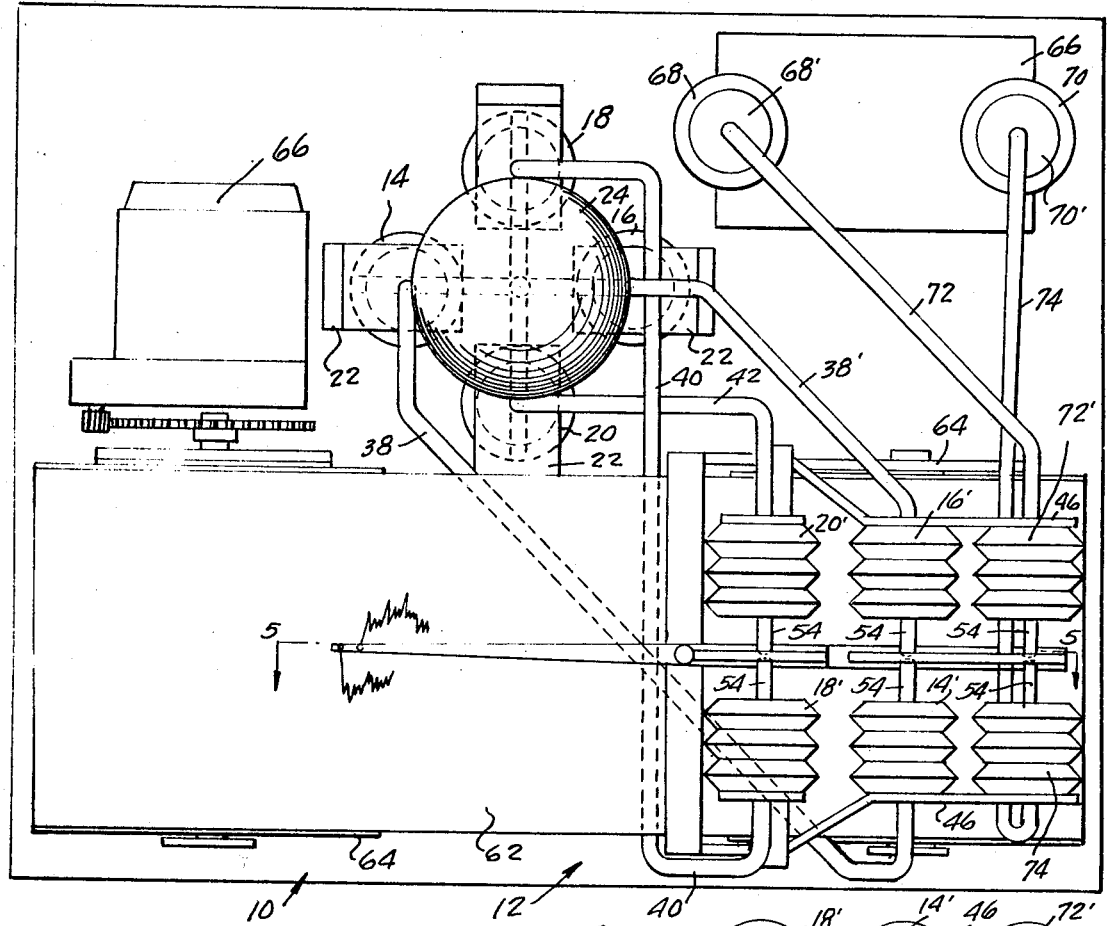
FIG. 1 is a plan view of the indicator device embodying the present invention.

Referring to the drawings, the reference numeral 10 generally designates the inertia indicating device of the present invention, and is provided with a flat base 12 upon which are disposed four vertical bellows members preferably made of Neoprene or rubber material filled with a suitable fluid.

Referring to FIGS. 1 and 3, one bellows member 14 is disposed in longitudinal alignment with another bellows member 16, while another bellows member 18 is disposed in alignment with a bellows member 20.

The device is preferably disposed in a vehicle such as a passenger car, so that the bellows members 14 and 16 are disposed longitudinally of the vehicle axis, with the bellows member 16 spaced forwardly of the bellows member 14, and with the bellows members 18 and 20 disposed transversely of the longitudinal axis of the vehicle.

The bellows members, as can best be seen in FIGS. 1 and 3, are preferably provided with brackets or support frames generally designated 22, which support them with respect to the base 12.

A metal spherical member or ball 24 is disposed centrally of the four bellows members and is provided with a vertical stem 26 having a pointed edge 28 adjacent its lower end. The pointed edge 28 of the vertical stem 26 is disposed in a conical recess 30 and the ball 24 and the stem 26 are positioned on the base 12 so that the movement of the vehicle upon which the device is placed will cause the ball 28 to tip in one direction or another about the focal point of the pointed edge 28 and the conical recess 30.

The lower end portion of the stem 26 is provided with cross bars 32 and 34 with the cross bar 32 extending between the bellows members 14 and 16 and the cross bar 34 extending between the bellows members 18 and 20. The metal ball 24 and the stem 26 and the cross bars 32 and 34 form a rigid member.

The cross bars 32 and 34 are positioned so as to be in contact with the lower or bottom of the respective bellows members against which they are positioned and biasing springs 36 are provided to maintain the cross bars in a proper position against the bellows members.

The bellows members are collapsible and are all provided with an individual fluid line in connection with a corresponding bellows member.

The bellows member 14 is provided with a fluid line 38 in communication with a corresponding bellows member 14' while the bellows member 16 is provided with a fluid line 38' in connection with a corresponding bellows member 16'.

The side bellows members 18 and 20 are provided with fluid lines 40 and 42, respectively, in communication with respective bellows members 18' and 20'.

The bellows members 14 and 16 have their respective fluid lines 38 and 38' in communication with the bellows members 14' and 16' at a place where the bellows members 14' and 16', as best seen in FIG. 1, are disposed in a horizontal aligned relationship with each other. The bellows members 14' and 16' are preferably supported adjacent their outer sides by bracket members 46 supported on spaced vertical bracket members 50 and 52 rigidly secured to the base 12 by any suitable well known means.

The bellows members 18' and 20' are also disposed in a horizontal position and in transverse alignment with each other, as best seen in FIG. 1.

The bellows members 14', 16', 18' and 20' are provided with plungers or stems 54 which are adapted to engage a stylus 58 therebetween. The stylus 58, supported by member 52, is of any well known construction and has a marker 60 adapted to record a marking on paper carried by an endless recorder belt 62, disposed on drums 64, driven by electric motor 66 or other suitable means.

Figure 2:
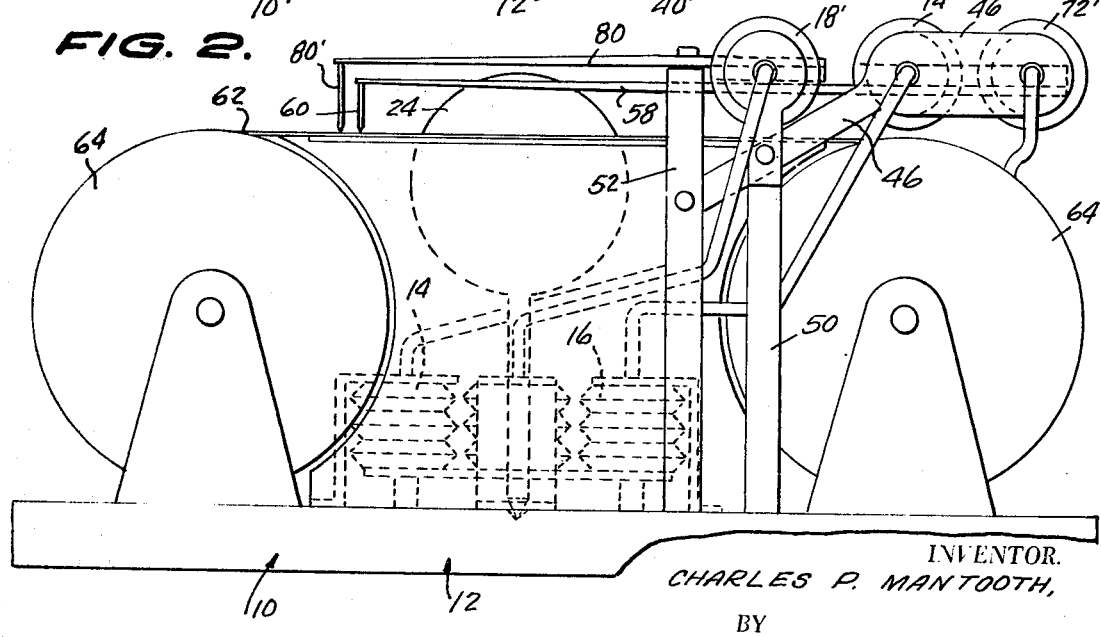
FIG. 2 is a side view of the indicator device illustrated in FIG. 1.

The solid metal ball will act in response to inertia depending upon whether the car is braked so as to stop it, or whether it is started and accelerated. The tilting or movement of the metal ball 24 will cause the bar 34 and the bar 32 to act in response to the movement of the ball 24 against one of the bellows members. For example, in FIGS. 1 and 2, the movement of the ball 24 to the right will cause a compression of the bellows member 14 by virtue of the bar 34 acting against its lower end. This will cause the fluid in the bellows 14 to move through the line 38' to expand the corresponding bellows member 14'. This inertia principle will apply upon acceleration or deceleration of the vehicle and also in turning the vehicle to the right or to the left. Thus, since all of the bellows member cylinders 14', 16', 18' and 20' are filled with a suitable fluid, any movement of the bellows member or cylinder will cause the opposite action of the bellows member attached to it by the corresponding fluid aligner. The movement of the corresponding bellows members, that is, 14', 16', 18' or 20' will cause their respective plungers 54 to move the stylus 58 so that the action will be recorded on the chart or paper carried by the belt 62. Thus, the movement of the ball 24 by the driving habits of the operator of the vehicle will be permanently recorded on the chart.

The indicator device of the present invention is further provided with a mercury reservoir 66 with bellows members 68 and 70 filled with mercury. When the vehicle is on a grade or hill or as in the drawing shown in FIG. 1, the left end of the reservoir 66 is tipped down and the mercury flows to its level or seeks its own level and forces the cylinder 68 to expand. This action compresses the bellows member 68' disposed in alignment with the bellows member 68, as best seen in FIG. 3, and forces the fluid through a fluid connecting line 72 into cylinder 72', and either expands the bellows member 72' or exerts a neutralizing pressure against the gravitational pressure of the inertia mechanism.

Referring to FIG. 1, it will be noted that the other end of the mercury reservoir 66 and its bellows member 70 is also provided with an aligned upper bellows member 70' which communicates through a fluid line 74 with another bellows member 74' disposed opposite and in alignment with the bellows member 72'. It will be noted that the bellows members 72' and 74' are provided with the stems 54 that contact another stylus 80 secured to the bracket member 52, which has a marker 80' adapted to record on the tape or charter or piece of paper that is carried by the belt 62. With proper adjustments, these bellows members 68 and 70, and their bellows members can be utilized to draw a line on the tape or the chart in accordance with the contour of the land over which the vehicle passes or to keep the braking and acceleration stylus at zero when not braking or accelerating.

Thus, in the present invention, it is apparent that a simplified and accurate indicator device can be provided which utilizes the inertia of the vehicle to cause fluid to operate stylus means so as to record the results of the inertia and to record particularly the driving habits of the vehicle operator, such as the amount of sway he will cause in the vehicle as he operates it or the sudden starts and stops that he makes as he accelerates or decelerates, and which further provides a recording of the contour of the land over which the vehicle is passing.

What is claimed is:

1. An indicator device for use with a vehicle and the like comprising first bellows means including a plurality of oppositely disposed pairs of bellows, and second bellows means, fluid pressure line means in communication with said first and second bellows means, and an inertia mechanism for transmitting an inertia force to said first bellows means comprising a weight with rigid stem means therein, pivot means on said stem means, bar means rigidly attached to said stem means and disposed to contact said bellows to cause compression thereof under predetermined conditions, and indicating means operatively connected to said second bellows means for recording the size of said force.

2. The device of claim 1 wherein said second bellows means include pairs of oppositely disposed horizontal bellows with stems therein, each in communication by said fluid line means with said first mentioned pair of bellows.

3. The device of claim 2 wherein said indicating means includes spaced rotatable drums with endless tape means thereon and marker means adapted to mark said tape means.

4. The device of claim 3 wherein said marker means includes a stylus and said bellows stems are disposed on opposite sides of said stylus and in contact therewith to cause it to mark said tape means in a predetermined way.

5. The device of claim 4 wherein said first pairs of bellows are vertically arranged and said inertia stem is substantially vertical and said bar means are substantially horizontal and contact the bottoms of said vertical bellows.

6. The device of claim 1 wherein a fluid reservoir is provided in communication with a third pair of bellows, and a fourth pair of bellows is provided, and other fluid pressure line means communicate with said third and fourth pairs of bellows and other indicator means are provided to record the inertia force of the fluid in said reservoir.

7. The device of claim 6 wherein said third pair of bellows are vertically aligned bellows at opposite ends of said reservoir.

8. The device of claim 7 wherein the fourth pair of bellows are horizontally aligned bellows.

9. The device of claim 8 wherein the other indicator means is a stylus and said horizontally aligned bellows have stems adapted to contact said stylus.

References Cited

UNITED STATES PATENTS

| 1,181,511 | 5/1916 | Eder et al. | 346—7 |
| 1,317,072 | 9/1919 | Carlier | 73—517 X |
| 1,595,225 | 8/1926 | Coffin | 73—489 |
| 1,889,089 | 11/1932 | De Giers | 346—72 X |
| 2,139,384 | 12/1938 | Schamehorn | 346—7 X |

JOSEPH W. HARTARY, Primary Examiner

U.S. Cl. X.R.

73—489, 515; 346—72